United States Patent
Welsh et al.

(10) Patent No.: US 9,215,436 B2
(45) Date of Patent: Dec. 15, 2015

(54) INSERTION OF 3D OBJECTS IN A STEREOSCOPIC IMAGE AT RELATIVE DEPTH

(75) Inventors: Richard J. Welsh, Wootton Bassett (GB); Christian B. Ralph, Wootton Bassett (GB)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 138 days.

(21) Appl. No.: 13/380,160

(22) PCT Filed: Jun. 22, 2010

(86) PCT No.: PCT/US2010/039543
§ 371 (c)(1),
(2), (4) Date: Dec. 22, 2011

(87) PCT Pub. No.: WO2011/005544
PCT Pub. Date: Jan. 13, 2011

(65) Prior Publication Data
US 2012/0099836 A1    Apr. 26, 2012

Related U.S. Application Data

(60) Provisional application No. 61/220,007, filed on Jun. 24, 2009.

(51) Int. Cl.
*H04N 13/04* (2006.01)
*H04N 13/00* (2006.01)

(52) U.S. Cl.
CPC ......... *H04N 13/0003* (2013.01); *H04N 13/004* (2013.01)

(58) Field of Classification Search
CPC .................. H04N 13/0003; H04N 13/004
USPC ........................................... 348/51
See application file for complete search history.

(56) References Cited

U.S. PATENT DOCUMENTS

| 4,859,994 A | 8/1989 | Zola et al. |
|---|---|---|
| 5,615,046 A | 3/1997 | Gilchrist |
| 6,631,205 B1 | 10/2003 | Melen et al. |

(Continued)

FOREIGN PATENT DOCUMENTS

| AU | 2010270951 B2 | 1/2011 |
|---|---|---|
| CN | 101180653 | 5/2008 |

(Continued)

OTHER PUBLICATIONS

PCT International Preliminary Report on Patentability with Annex of International Application PCT/US2010/039547 filed on Jun. 22, 2010 in the name of Dolby Laboratories Licensing Corporation.

(Continued)

*Primary Examiner* — Richard Torrente

(57) ABSTRACT

Techniques for rendering at least one object into a stereoscopic image for a display device are provided. Perceptual depth data as a fraction of viewer distance for the object is received. This perceptual depth data can be normalized. A pixel separation offset for a particular display device is calculated from the perceptual depth data. Left and right eye images of the object are respectively inserted into the stereoscopic image with the pixel separation offset. For a specific embodiment, the object includes captioning to be inserted.

20 Claims, 12 Drawing Sheets

(56) References Cited

U.S. PATENT DOCUMENTS

| | | |
|---|---|---|
| 6,944,328 B2 | 9/2005 | Yoshida |
| 7,015,920 B2 | 3/2006 | Ono |
| 7,046,270 B2 | 5/2006 | Murata et al. |
| 7,075,587 B2 | 7/2006 | Lee |
| 7,177,357 B2 | 2/2007 | Yun et al. |
| 7,274,816 B2 | 9/2007 | Yoshida |
| 7,692,640 B2 | 4/2010 | Van Geest |
| 7,787,658 B2 | 8/2010 | Redert |
| 8,451,326 B2 * | 5/2013 | Inaba ............... 348/58 |
| 2003/0103062 A1 | 6/2003 | Lee et al. |
| 2004/0233275 A1 | 11/2004 | Tomita |
| 2005/0146521 A1 | 7/2005 | Kaye |
| 2006/0088206 A1 | 4/2006 | Era |
| 2006/0103664 A1 | 5/2006 | Nakanishi |
| 2007/0008575 A1 | 1/2007 | Yu et al. |
| 2007/0041444 A1 | 2/2007 | Gutierrez Novelo |
| 2007/0047040 A1 | 3/2007 | Ha |
| 2007/0146232 A1 | 6/2007 | Redert |
| 2007/0257902 A1 | 11/2007 | Satoh |
| 2007/0288844 A1 | 12/2007 | Zingher et al. |
| 2008/0278487 A1 | 11/2008 | Gobert |
| 2008/0303813 A1 | 12/2008 | Joung et al. |
| 2009/0092335 A1 | 4/2009 | Kim et al. |
| 2009/0142041 A1 | 6/2009 | Nagasawa et al. |
| 2009/0315979 A1 | 12/2009 | Jung et al. |
| 2010/0021141 A1 | 1/2010 | Yamashita et al. |
| 2010/0142924 A1 * | 6/2010 | Yamashita et al. ............... 386/95 |
| 2010/0220175 A1 * | 9/2010 | Claydon et al. ............... 348/43 |
| 2010/0303444 A1 * | 12/2010 | Sasaki et al. ............... 386/248 |
| 2011/0135005 A1 | 6/2011 | Tourapis et al. |
| 2011/0170792 A1 | 7/2011 | Tourapis et al. |

FOREIGN PATENT DOCUMENTS

| | | |
|---|---|---|
| DE | 19545356 A1 | 5/1996 |
| EP | 0777393 | 6/1997 |
| EP | 1089573 | 4/2001 |
| EP | 1744564 | 1/2007 |
| EP | 1912446 | 4/2008 |
| GB | 2413910 | 11/2005 |
| JP | H09-172654 | 6/1997 |
| JP | 2001/218229 | 8/2001 |
| JP | 2003009185 | 1/2003 |
| JP | 2004/220127 | 8/2004 |
| JP | 2004274125 | 9/2004 |
| JP | 2004274125 A | 9/2004 |
| JP | 2006/325165 | 11/2006 |
| RU | 2237283 | 9/2004 |
| RU | 2340116 | 11/2008 |
| WO | 9837698 | 8/1998 |
| WO | 9930280 | 6/1999 |
| WO | 0180548 | 10/2001 |
| WO | 2004030375 | 4/2004 |
| WO | 2004059980 | 7/2004 |
| WO | 2006111893 | 10/2006 |
| WO | 2007064159 | 6/2007 |
| WO | 2007066868 | 6/2007 |
| WO | 2007/092647 | 8/2007 |
| WO | 2008030011 | 3/2008 |
| WO | 2008038205 | 4/2008 |
| WO | 2008044191 | 4/2008 |
| WO | 2008063170 | 5/2008 |
| WO | 2008115222 | 9/2008 |
| WO | 2008122838 | 10/2008 |
| WO | 2008150111 | 12/2008 |
| WO | WO 2009004742 A1 * | 1/2009 |
| WO | 2010/010521 | 1/2010 |
| WO | 2010064118 | 6/2010 |
| WO | 2010070567 | 6/2010 |
| WO | 2010151555 | 12/2010 |
| WO | 2011/005025 | 1/2011 |
| WO | 2011006104 | 1/2011 |

OTHER PUBLICATIONS

PCT International Search Report of International Application PCT/US2010/039547 filed on Jun. 22, 2010 in the name of Dolby Laboratories Licensing Corporation.

PCT Informal Communication of International Application PCT/US2010/039547 filed on Jun. 22, 2010 in the name of Dolby Laboratories Licensing Corporation.

Response to PCT Informal Communication of International Application PCT/US2010/039547 filed on Jun. 22, 2010 in the name of Dolby Laboratories Licensing Corporation.

PCT Written Opinion of International Application PCT/US2010/039547 filed on Jun. 22, 2010 in the name of Dolby Laboratories Licensing Corporation.

Response to PCT Written Opinion of International Application PCT/US2010/039547 filed on Jun. 22, 2010 in the name of Dolby Laboratories Licensing Corporation.

PCT International Preliminary Report on Patentability with Annex of International Application PCT/US2010/039543 filed on Jun. 22, 2010 in the name of Dolby Laboratories Licensing Corporation.

PCT International Search Report of International Application PCT/US2010/039543 filed on Jun. 22, 2010 in the name of Dolby Laboratories Licensing Corporation.

Response to Informal Communication of International Application PCT/US2010/039543 filed on Jun. 22, 2010 in the name of Dolby Laboratories Licensing Corporation.

PCT Written Opinion of International Application PCT/US2010/039543 filed on Jun. 22, 2010 in the name of Dolby Laboratories Licensing Corporation.

Hutchison, D., Introducing DLP 3-D TV, DLP Texas Instruments, Jan. 2008, 1-5.

McCormick, et al., Implementation of stereoscopic and dualview images on a micro-display high definition television, 3DTV-Con'08, May 28-30, 2008, 33-36.

Gali-3D, Adding stereoscopic subtitles to your movies by the help of ffdshow, retrieved on Mar. 31, 2011 from http://www.gali-3d.com/archive/arlicles/ffdshow-manual/ffdshow_stereo_subtitles.php.

Koster, et al., Use two video-display processors to achieve 3-D, overlay effects, EDN May 31, 1984, 135-148.

3dTV virtual realities stereoscopic subtitle guide, retrieved on Mar. 31, 2011 from http://www3dtv.at/Knowhow/Subtitles_en.aspx.

Yasuda, T. et al., A Study of 3D Image Generating Method using Server Rendering, The Institute of Electronics, Information and Communication Engineers, 19th data Engineering Workshop Theses, Japan, The Institute of Electronics, Information and Communications Engineers, Special Committee for Data Engineering Research, Apr. 7, 2008.

Translation of Office Action issued for related Russian patent application No. 2012101829/07 (002475) filed Jun. 22, 2010 in the name of Dolby Laboratories Licensing Corporation; mailed Jun. 2013.

Office Action of Argentine Published Patent Application No. AR 077201 A1. 4 Pages.

Substantive Examination Adverse Report dated Feb. 13, 2015 of Malaysian Patent Application No. PI 2011005889 filed on Jun. 22, 2010 in the name of Dolby Laboratories Licensing Corporation with translation. 3 Pages.

* cited by examiner

OVERLAID SEGMENTATION DISPARITY MAP WITH SEPARATION MEASUREMENTS

SIMPLE BOUNDING LIMITS FOR OBJECT

COMPLEX OBJECT GEOMETRY

INSERTION OF 3D OBJECTS IN A STEREOSCOPIC IMAGE AT RELATIVE DEPTH

CROSS REFERENCE TO RELATED APPLICATION

This application is the U.S. national stage of International Application PCT/US2010/039543 filed on Jun. 22, 2010, which in turn claims priority to U.S. Provisional Patent Application No. 61/220,007 filed Jun. 24, 2009, hereby incorporated by reference in its entirety.

TECHNOLOGY

The invention relates to the field of three dimensional (3D) imaging and, in particular, to object processing for perceptual depth placement.

BACKGROUND

For two dimensional (2D) displays, captioning (e.g., subtitling, closed-captioning, and the like) can be arbitrarily rendered into a pre-existing 2D image by a video playback device, or by compositing software. The inserted 2D captioning will appear by occlusion to be in front or behind features in the pre-existing image. Auxiliary data provided with the captioning can specify simple 2D placement locations and styles. For example, a caption's auxiliary data from a broadcast can specify either roll-up, pop-up or paint-on captioning. Roll-up captioning typically appears at the bottom of the screen, while pop-up captioning appears anywhere on the screen. Paint-on captioning uses a predetermined stationary block on the screen.

However, these conventional techniques are unsuitable for a pre-existing 3D image. Arbitrary rendering of captioning in 3D space results in captioning existing in the background (e.g., behind a pre-existing feature) but rendered in the foreground (e.g., in front of the pre-existing feature), or oppositely existing in the foreground and rendered in the background. In other words, the captioning can appear by occlusion to be in front of a feature while appearing by interocular disparity to be behind the same feature. This conflict confuses the human visual system which breaks the illusion of depth in the 3D image, as well as cause eye fatigue for a viewer.

These pitfalls can be avoided with manual eyes-on analysis of each 3D captioning insertion during post-production. That is to say, a human editor confirms the appropriateness of each insertion. As one can imagine, this process is time consuming, costly, and prone to human error. Manual eyes-on analysis is not practical for pre-recorded content and all but impossible for a live broadcast.

Furthermore, manual eyes-on analysis is performed for a specific display device dimension and often yields an unanticipated result for a different display device. Perceptual depth is non-linear with pixel disparity, and pixel disparity is a function of both pixel separation offset and each display device's pixel resolution. Accordingly, inserted captioning can appear in an undesirable location even using the same pixel separation offset. For example, captioning can appear on the different display device to exist beyond infinity causing divergence of the viewer's eyes. The captioning appears beyond infinity when its pixel disparity between right and left eye images is greater than the viewer's interocular separation, which is generally about 65 millimeters for an adult. An unanticipated result can also include illegal positioning of the captioning, such as behind the viewer, which is impossible to achieve on a display.

From the above, it is seen that 3D captioning, as well as 3D object insertion in general, positioned automatically and/or independently of a display device can provide many benefits over conventional 2D and 3D techniques.

SUMMARY OF THE DESCRIPTION

Methods and apparatuses for rendering at least one object into a stereoscopic image for a display device are provided. The stereoscopic image can include two images (e.g., a right eye image and a left eye image) manipulated separately or composited together. In one embodiment, a method includes receiving perceptual depth data as a fraction of viewer distance for the object. A pixel separation offset for a particular display device is calculated using the perceptual depth. First and second images (such as, left and right eye images) of the object are respectively inserted into the stereoscopic image with the pixel separation offset.

In another embodiment of the invention, depth data as a fraction of viewer distance is provided for at least a portion of a caption. The depth data is used to determine an appropriate pixel separation offset between first and second images of the caption to substantially obtain a desired perceptual depth. The first and second images of the caption are inserted in a stereoscopic image or image bit stream with the determined pixel separation offset. In a specific embodiment, the provided depth data is normalized for a representational display device (for example, one pixel per millimeter resolution, 1 meter width).

In yet another embodiment, a method for object insertion into a stereoscopic image is provided. The stereoscopic image is transmitted, directly or indirectly, to a first playback device (such as, a mobile phone, computer, television, cinema projector or the like). Perceptual depth data as a fraction of viewer distance for at least one object is also transmitted to the first playback device. The first playback device is capable of calculating a first pixel separation offset from the perceptual depth data. The stereoscopic image, as well as the same perceptual depth data, is transmitted, directly or indirectly, to a second playback device. The second playback device is capable of calculating a second pixel separation offset from the perceptual depth data. In the event the first and second playback devices have different screen width dimensions or pixel resolutions, then the first pixel separation offset is unequal to the second pixel separation offset.

In another embodiment of the invention, a method provides for generating normalized depth data for object rendering in a 3D stereoscope image. The method includes identification of a feature within a stereoscopic image by, for example, segmentation. A spatial offset (such as, a pixel separation offset) in the stereoscopic image is determined for the feature. A plurality of spatial offsets can optionally be used to form a disparity map of the stereoscopic image. The spatial offset correlates to a perceived depth, and thus the position and occupied volume of the feature in 3D space can be determined. The method further includes determining geometry of a stereoscopic object image to be inserted into the stereoscopic image. One or more object spatial offsets are calculated to place the stereoscopic object in 3D space while avoiding the occupied volume, as well as satisfying any other placement restriction. Each of the calculated one or more object spatial offsets can be normalized to be display device independent and expressed as its corresponding perceptual depth as a fraction of viewer distance. A data stream of the each perceptual depth can be outputted. In a specific embodiment, a depth map of the stereoscopic image is further used to more accurately adjust perceived depth(s), and accordingly the position and occupied volume of the feature.

In another embodiment of the invention, an apparatus for generating an output signal includes an input terminal, an output terminal, and a signal processing circuitry coupled to the input terminal and the output terminal. The signal processing circuitry is adapted to receive perceptual depth data as a fraction of viewer distance for at least one object and calculate an appropriate pixel separation offset. The signal processing circuitry inserts, respectively, a left eye object image and a right eye object image of the at least one object into a left eye image and a right eye image of a stereoscopic image. The left eye object image and right eye object image are offset by the pixel separation offset.

In another embodiment of the invention, an apparatus for generating depth data for object rendering includes an input terminal, an output terminal, and a signal processing circuitry coupled to the input terminal and the output terminal. The signal processing circuitry is adapted to identify features within a stereoscopic image and determine spatial offsets for the features. Spatial offsets can optionally be used by the signal processing circuitry to form a disparity map. The signal processing circuitry is adapted to further determine geometry of a stereoscopic object image to be inserted into the stereoscopic image and calculate one or more object spatial offsets to place the stereoscopic object in 3D space while avoiding occupied volumes, as well as satisfying any other placement restriction. Each of the calculated one or more object spatial offsets can be normalized to be display device independent and expressed as its corresponding perceptual depth as a fraction of viewer distance. A data stream of the each perceptual depth can be outputted through the output terminal.

As another embodiment of the invention, a storage medium recording a program of instructions is provided. The program is executable by a display device to perform a method for generating an output. The method includes receiving normalized perceptual depth data as a fraction of viewer distance for at least one object. A pixel separation offset is calculated for the display device from the normalized perceptual depth data and a display dimension. First and second object images of the at least one object are inserted into a first and second images of the stereoscopic image. The first and second object images are offset by the pixel separation offset. The display device visually outputs the stereoscopic image along with the inserted object.

Various additional objects, features, and advantages of the invention can be more fully appreciated with reference to the detailed description and accompanying drawings that follow.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
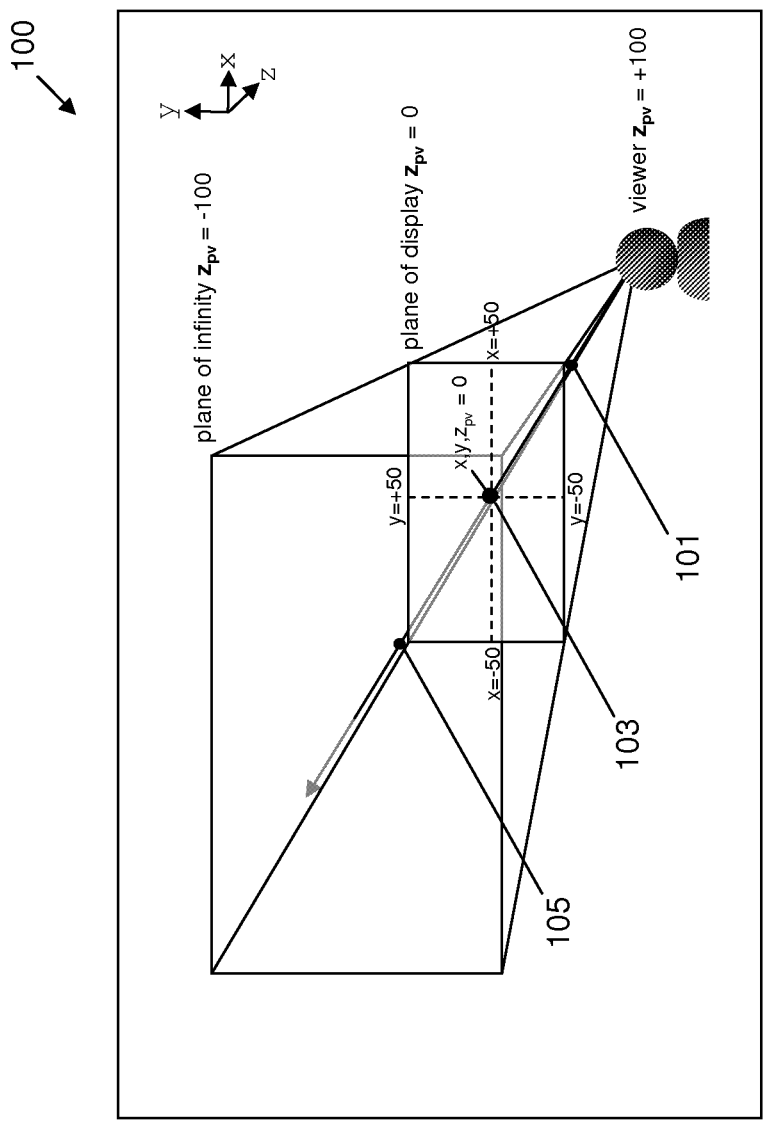
FIG. 1 illustrates a 3D positioning layout according to an embodiment of the invention.

The following description and drawings are illustrative of the invention and are not to be construed as limiting the invention. Numerous specific details are described to provide a thorough understanding of the invention. However, in certain instances, well known or conventional details are not described in order to avoid obscuring the description of the invention. References to one or an embodiment in the present disclosure are not necessarily references to the same embodiment; and, such references mean at least one, FIG. 1 illustrates of a 3D positional system 100 according to an embodiment of the invention. Positional data is used to determine where to place an object when rendering it into a target 3D image. The object can include any of: subtitle text, closed captioning, on-screen information bar, scrolling news ticker, television programming guide, scoreboard, on-screen playback device controls (optionally displayed touch screen controls), channel logo overlay, heads-up display (HUD) information or other graphical objects. In order to allow device independence during playback, a percentage positional system is used. Position in 3D space is expressed as a percentage of the screen width (x-axis), screen height (y-axis), and viewer distance from the screen (z-axis).

Figure 2A:
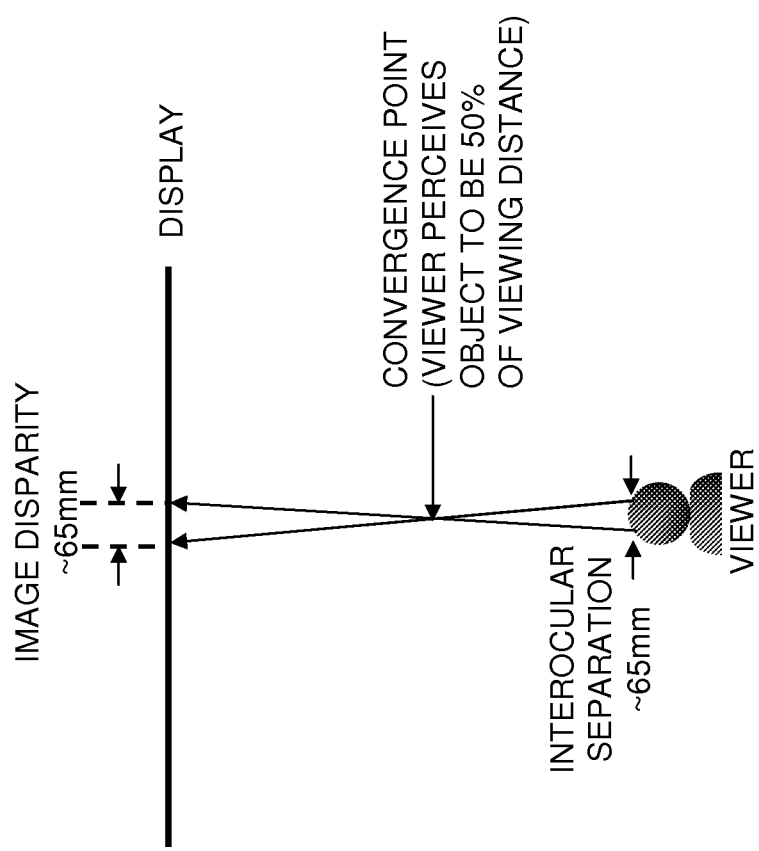
FIG. 2A illustrates, as an example, a trigonometric relationship between image disparity and interocular separation.
Figure 2B:
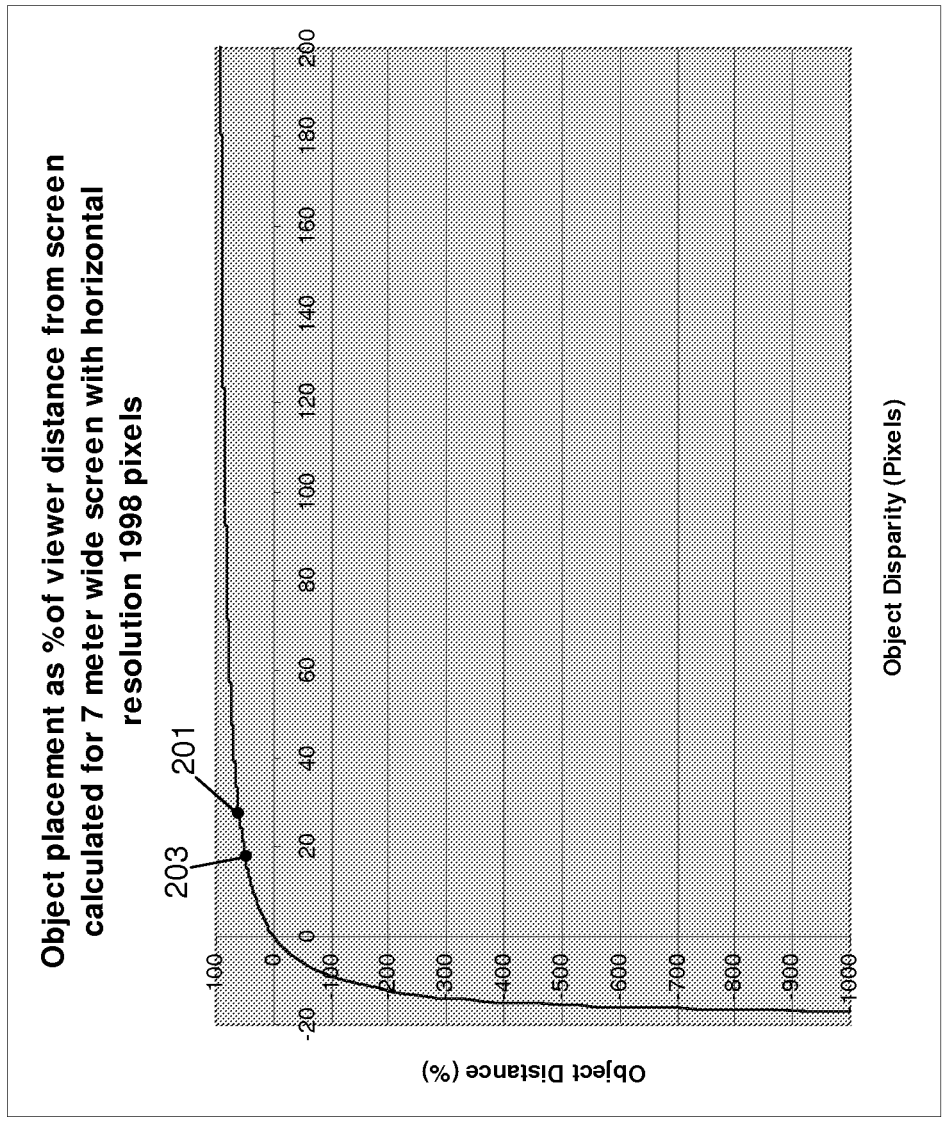
FIG. 2B illustrates perceptual depth as a function of pixel disparity for an exemplary 7 meter wide display according to an embodiment of the invention.

For instance, a stereoscopic object with x-axis positive disparity of 19 pixels between left and right eye images in a 2048 pixel wide image represents about 0.927% (19/2048) of the image width. The result, as an example, is that the stereoscopic object appears to he in front of the screen plane, halfway between the viewer and screen (e.g., about 50% of viewer distance from the screen plane). Now, for a 7 meter wide screen, the stereoscopic object can be separated according an embodiment of the invention by 0.927% of screen width, 64.94 millimeters (7 meters * 0.927%) or about 27 pixels (assuming a 1998 pixel horizontal width). This again results in the stereoscopic object appearing to be about halfway between the viewer and the screen as substantiated by the trigonometric relationship of FIG. 2A and point 201 in FIG. 2B. In contrast, a 19 positive pixel disparity on the 7 meter wide screen, representing 0.951% (19/1998) of screen width, results in a perceptual depth noticeably closer to the screen plane as shown by point 203 in FIG. 2B.

As can be seen from the above example, proportional positioning maintained depth perception for different devices, while absolute pixel disparity did not. It is desirable that perceptual depth on the z-axis remains constant irrespective of display device dimension. In other words, the 3D image should be consistent when viewed from differing playback devices, although pixel disparity may well change. In fact, changes in pixel disparity will typically be non-linear from one playback device to another.

Device independence of perceived depth is advantageous as viewer distance in 3D positional system 100 can vary significantly. For example, viewer distance can range from about 15 centimeters to about 1 meter for a handheld device (e.g., cellular telephone, personal digital assistant (PDA), portable media player—Apple's video iPod, and the like).

Viewer distance can increase for laptop computers, desktop computers, televisions, and arcade game displays to about 0.5 meter to about 5 meters. At public venues, viewer distances can range from about 3 meters to about 100 meters or more for cinema projectors, stadium displays, and billboards. Playback devices consequently have wide variation in display sizes based on intended viewer distance. A screen width for one playback device as compared to another playback device can be larger, 5 times larger, 10 times larger, or 100 times larger or more.

According to an embodiment of the invention, positional values on the z-axis (depth) can be defined as a percentage of viewer distance from the screen plane, $Z_{pv}$. In this way, positional depth values can be device independent. For example, referring back to FIG. 1, a first object at +50% (point 101) will always be perceived halfway between the viewer and the screen plane, regardless of absolute viewer position or display dimension. Second and third objects at 0% (point 103) and −50% (point 105) will always be double the distance (on the screen plane) and triple the distance (behind the screen plane) of the first object distance, respectively. As a viewer moves closer to the screen plane compared from one playback device to another, an object will appear to be closer to her in absolute terms. As she moves away from the screen plane, the object appears to be further away. However, the object will importantly appear at the same proportion of viewer distance.

In a particular embodiment, in order to translate $Z_{pv}$ into a useable value for a playback device, physical screen width, $w_s$, of the assumed display device used for depth placement is known or communicated. In other words, the playback device will receive positional data as at least x, y, $Z_{pv}$, and $w_s$ values. With the provided information the playback device can compute the appropriate pixel disparity on the x-axis for its own display dimensions to achieve perceived depth $Z_{pv}$.

In another embodiment, a normalized 1 meter screen width can be used, such as a 1000 pixel wide screen with 1 millimeter per pixel resolution. Normalization provides an advantage that the playback device need only know its own screen width to appropriately render an object at depth, and composition software can virtually render (e.g., no physical screen used to make object depth decision) using the normalized screen width. That is to say, a $w_s$ value need not be communicated since it is known a priori.

It should be understood that this numerical presentation of $Z_{pv}$ can produce values beyond the capability of a particular playback device, principally small, low resolution legacy devices. For example, mobile phone video displays can be as small as 26 millimeters wide (or even smaller), and are thus limited to a maximum depth of +29%. Contemporary playback devices offer larger display sizes with much improved resolution and are capable of rendering at greater depth—although, these devices still cannot achieve +100% of viewer distance. This limitation is not a practical hindrance as +100% depth is almost always undesirable. The pixel disparity of an object placed very close to a viewer makes it difficult for the viewer to focus on and converge the object.

Additionally, the numerical presentation of $Z_{pv}$, a percentage of viewer distance, cannot adequately express depth at or beyond the plane of infinity. This shortfall is traversed by appreciating that an object will appear to be at infinity when the visual axes of a viewer's eyes are parallel. Thus, the plane of infinity can be specified to be at or about the negative value of interocular separation (about −65 millimeters for an adult). For a normalized 1 pixel/millimeter screen, the plane of infinity can be established to have a pixel separation offset at or about −65 pixels.

Figure 3:
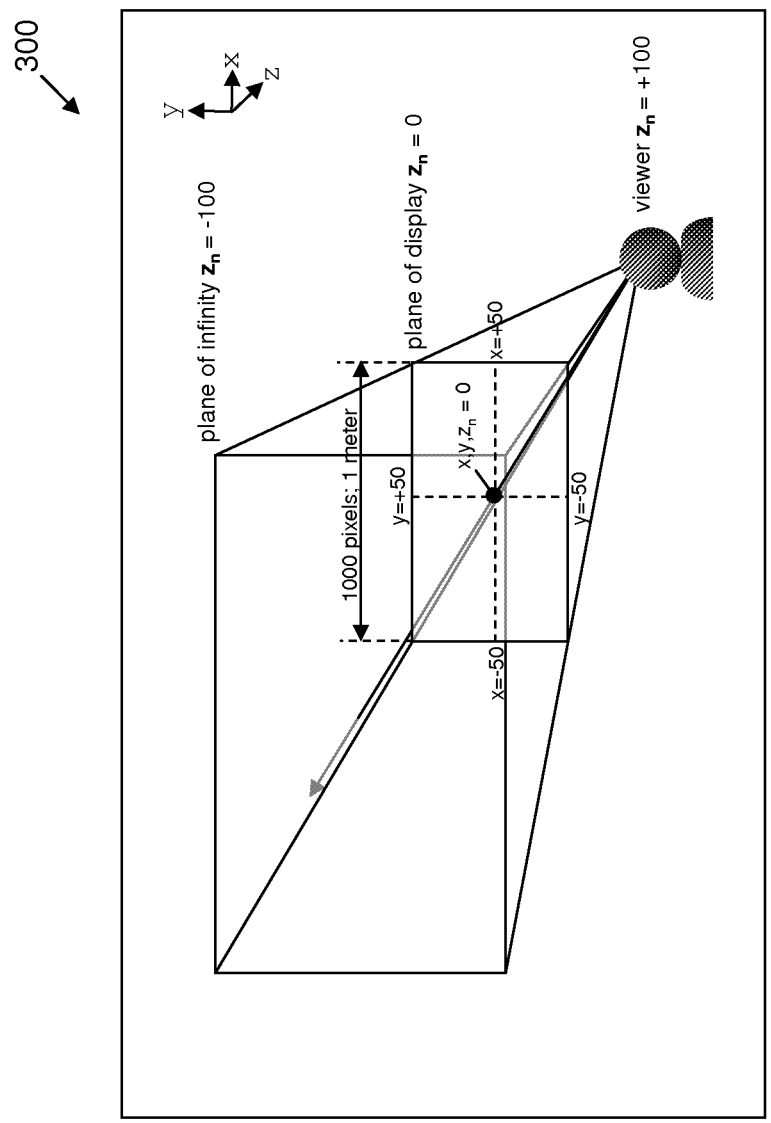
FIG. 3 illustrates a 3D positioning layout for a normalize screen according to an embodiment of the invention.

Using 3D positioning layout 300 for a normalized screen as shown in FIG. 3, either a playback or compositing device can appropriately insert an object, such as captioning, into a 3D image when provided with three positional values: x as a percent of screen width, y as a percent of screen height, and z as a percent of perceived normalized depth. A normalized pixel separation offset, $S_p$, can then be computed at least as follows, without limitation:

$$S_p = z_n \left( \frac{65}{100 - z_n} \right),$$

where $0 \leq z_n < 100$ (i.e., object lying on or in front of screen plane towards viewer position); and $S_p = 0.65 z_n$, where $z_n < 0$ (i.e., object lying behind the screen plane away from the viewer position).

The normalized pixel separation offset allows object placement in 3D space with respect to a viewer's perceived depth independently of display size or viewer distance. A playback device can use the normalized pixel separation offset ($S_p$) received, for example as metadata in a bitstream, to compute a device specific pixel separation offset ($S_d$) by adjusting with a factor of its own pixel pitch. If the playback device's pixel pitch is 0.5 millimeters instead of 1 millimeter of the normalized screen, then $S_d = S_p / 0.5$, in this example.

Figure 4:
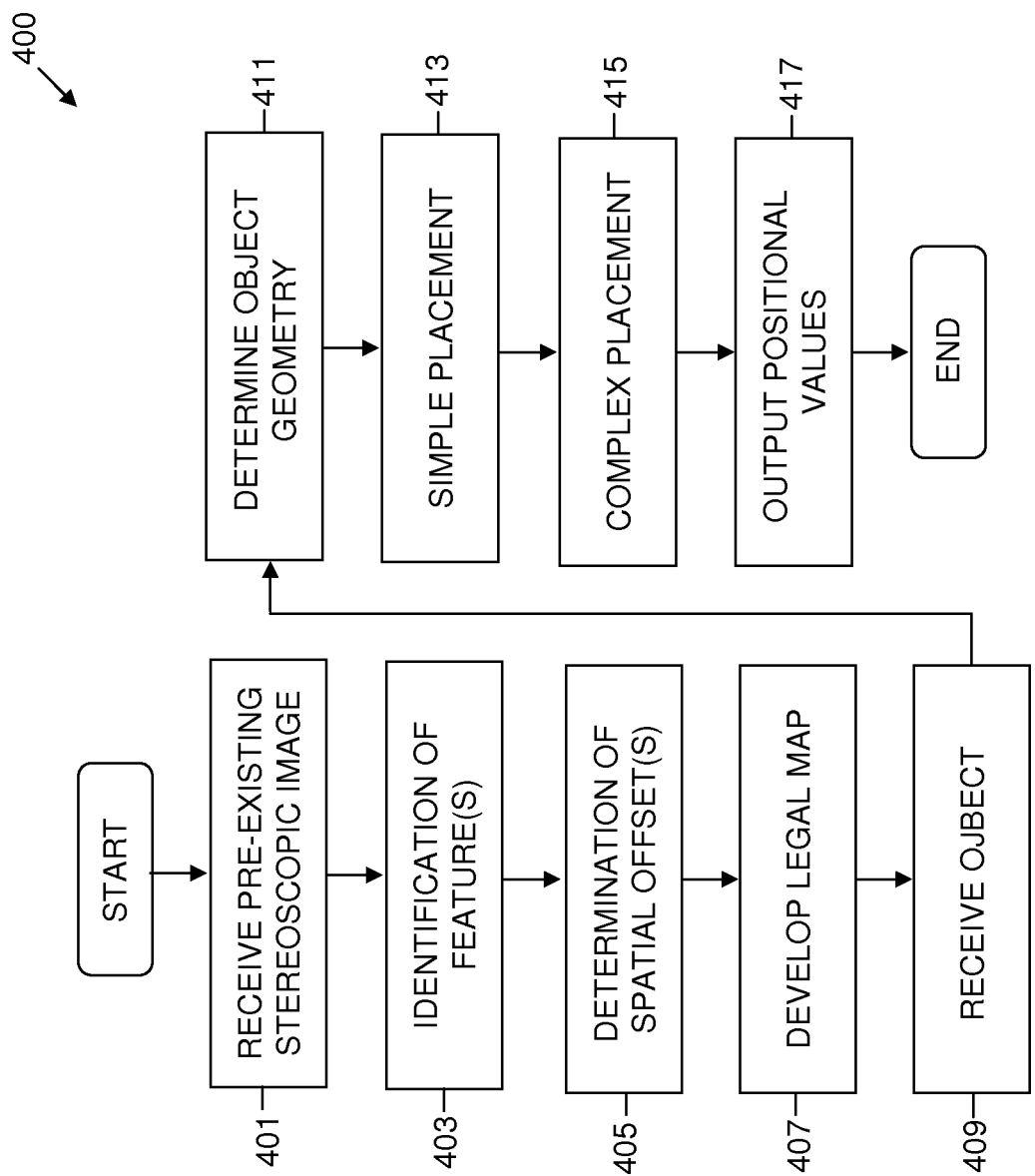
FIG. 4 illustrates a simplified flow diagram for 3D object placement according to an embodiment of the invention.

FIG. 4 illustrates a simplified flow diagram 400 for 3D object placement by, for example, a compositing device according to an embodiment of the invention. In step 401, a pre-existing stereoscopic image, the target image, is received. The position and extent of features of the image are identified in step 403, which can be implemented for example by segmentation analysis on each stereoscopic image pair (e.g., left eye and right eye images). Segmentation analysis separates each feature (e.g., a pre-existing object in the image) by color and then applies a boundary to each distinct area to form a segmentation map.

Next, in step 405, spatial offset are determined for the features. This can be accomplished by comparing segmentation maps of the left eye image to the right eye image. Segmentation maps for left and right eye images are similar, and accordingly features or segment shapes in one map of the pair naturally relates to similarly shaped and located features or segments in its complement. The pair of maps can be compared to determine the x-axis spatial offset between complementary features in the pair, These spatial offsets are used in optional step 407 to develop a legal map. The legal map defines 3D volumes available for object placement. That is to say, the legal map indicates volumes unoccupied by the features. This legal map can be dynamically updated throughout a persistence duration of the object to be placed into the target image.

In steps 409 and 411, an object for placement is received and its geometry to define bounding limits is determined. In simple cases, object geometry can be defined by a simple bounding box around the entire object with any required interspace (e.g., minimum distance between the object and any feature in the target image) as discussed below for FIG. 5F. In complex cases, object geometry can require tighter definition than a single bounding box. For example, object geometry can be characterized by a bonding box shaped for each character as discussed below for FIG. 5E.

Next, in step 413 of FIG. 4, the object is placed in 3D volume obeying simple placement rules, which are preferably designed to minimize fatigue on the human visual system. Simple placement rules generally have one or more of the following attributes: no clashes with features in the original image; object always in front (alternatively, object always in back); simple object geometry: text or object size; depth maxima and minima; and static placement.

Simple placement rules can be an origin and a set of hierarchical options. For example, a simple placement rule for an object to be center screen on the screen plane can be:

| Origin: | 0: x = 0 y = 0 z = 0 |
|---|---|
| Options: | 1: x = −20 |
| | 2: x = +20 |
| | 3: x < 0 |
| | 4: x > 0 |
| | 5: 0 < z ≤ 50 |
| |     5a: x < 0 |
| |     5b: x > 0 |
| | 6: Error |

If position x=0, y=0, z=0 is unavailable, then 20% left is preferred followed by 20% right, anywhere to the left, anywhere to the right, anywhere in front up to a maximum of 50%, then forward to the left, and finally forward to the right. If none of these preference locations are available, then an error can be returned.

In step 415, complex placement rules are optionally followed in lieu of, or in addition to, step 413. Complex placement rules can involve dynamic change to allow the object to have motion based upon the motion of features in the original image. Complex placement typically requires tighter definition than a simple bounding box, and thus complex object geometry is often used. In fact, in complex placement, object geometry can differ from the original due to morphing of the object to satisfy complex placement preferences as illustrated by FIG. 5F to be discussed below.

Complex placement can be generalized as having one or more of the following attributes; dynamic rules; clashes with objects in the original image allowed; occlusion allowed; complex object geometry; and dynamic placement. An example of complex placement is a dynamic graphic object which appears to move around from (i) behind a feature in the original image to (ii) in front of the feature and closer to the viewer. In this example, the dynamic graphic object is undergoing dynamic scaling, rotation, and movement, while object geometry is also dynamic. It initially clashes with, and is occluded by, the original feature in the scene, and then avoids and occludes the original feature.

Finally, in step 417 of FIG. 4, positional values reflecting the placement of the object can be outputted. The positional values are expressed as a percent of screen width, percent of screen height, and percent of perceived depth. The percent of perceived depth can be normalized for a representational display device. In a specific embodiment, the representational display device is characterized by a normalized 1000 pixel wide screen of 1 millimeter per pixel width resolution.

It is appreciated that flow diagram 400 described herein is for illustrative purposes only and that various modifications or changes in light thereof will be suggested to persons skilled in the art. In alternative implementations, the steps noted in flow diagram 400 may occur out of the order noted in FIG. 4, may include additional steps, and/or may omit some steps altogether. For example, steps 401 and 409 may in fact be executed substantially concurrently or in reverse order. All such modifications and variations are intended to be included within the scope of this disclosure.

Figure 5A:
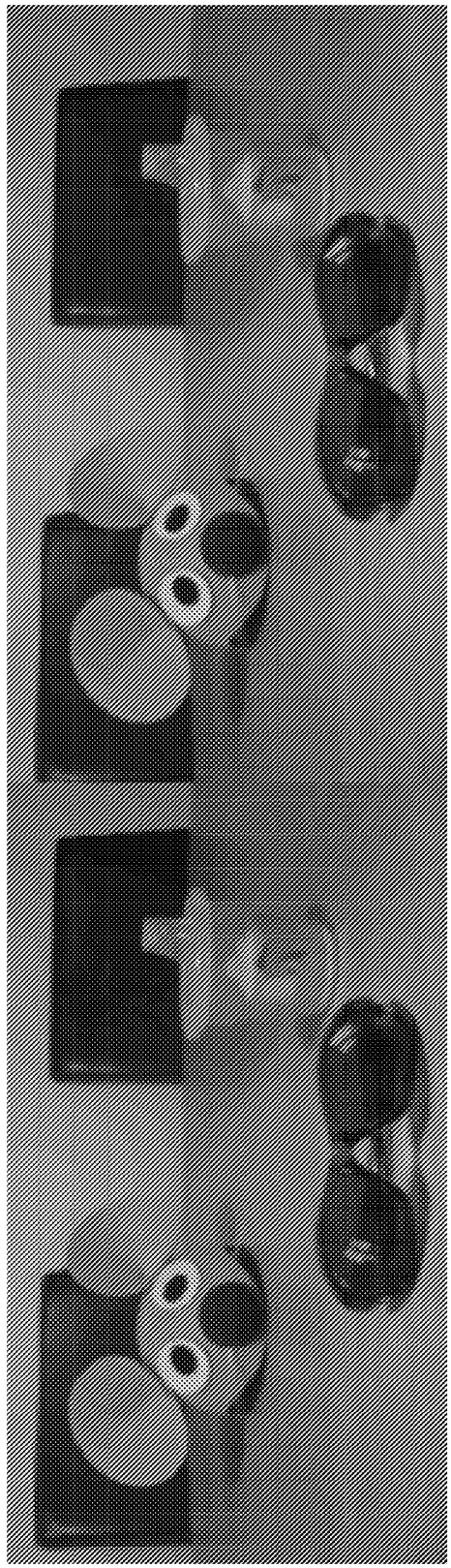
FIGS. 5A-5F illustrate exemplary results for the simplified flow diagram for 3D object placement according to an embodiment of the invention.
Figure 5B:
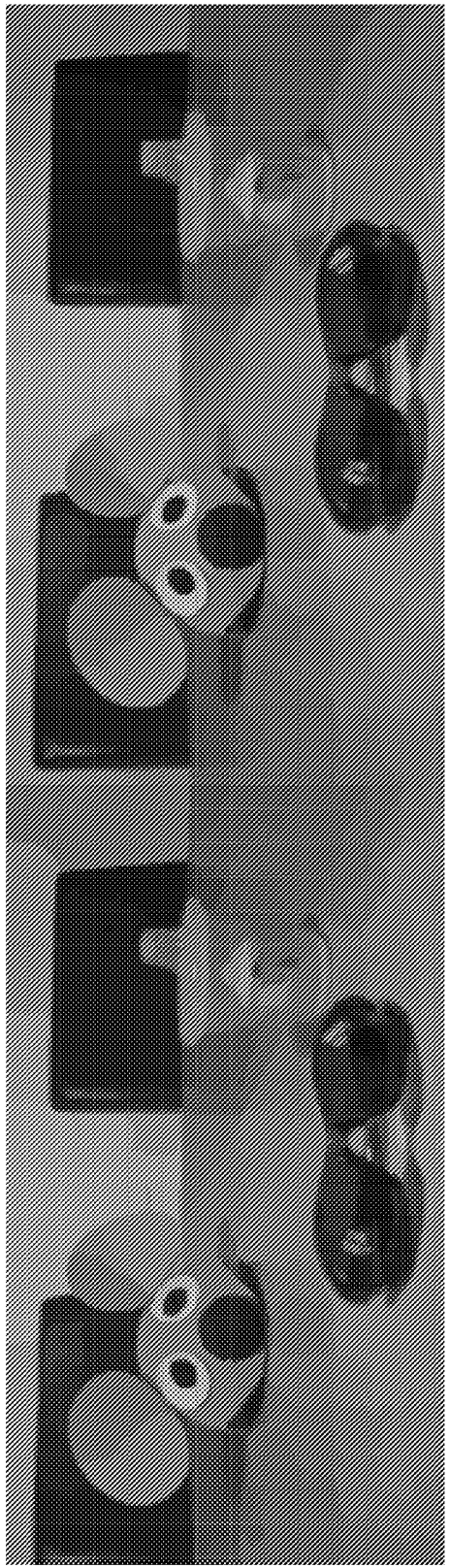
Figure 5C:
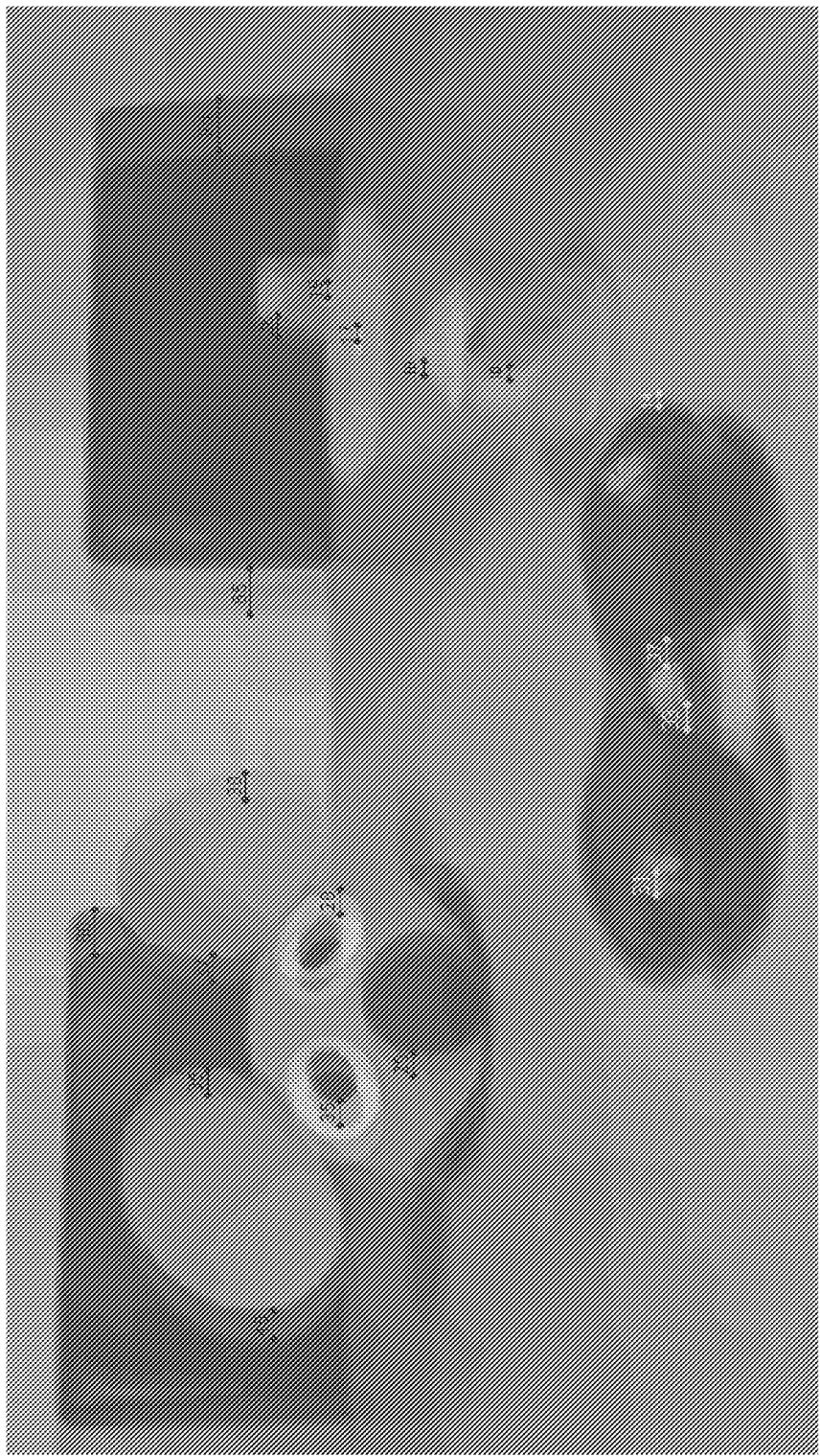
Figure 5D:
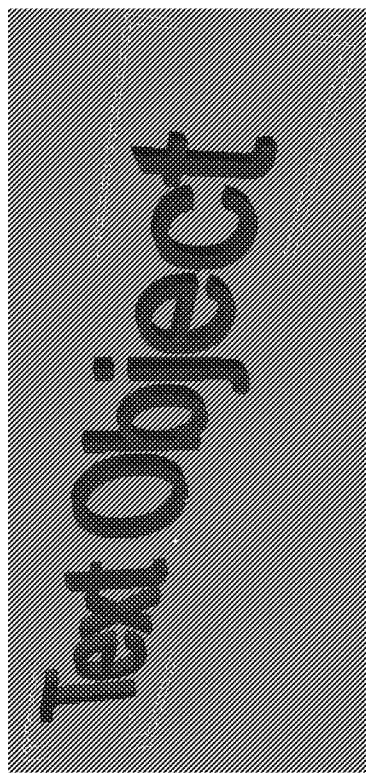
Figure 5E:
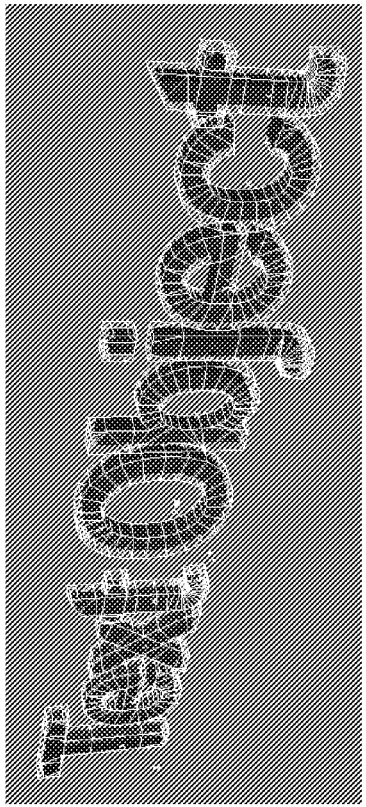
Figure 5F:
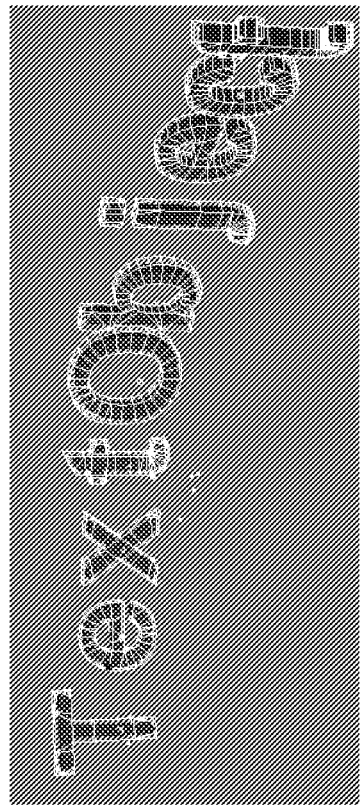

FIGS. 5A-5F illustrate exemplary results for the simplified flow diagram 400 above for 3D object placement according to an embodiment of the invention. FIG. 5A shows left and right eye images of the pre-existing stereoscopic image that can be received in step 401. Segmentation maps described in step 403 are shown in FIG. 5B, and are overlaid in FIG. 5C to show separation disparity between the two. A "Text Object" with a simple bounding limit, a single box, is illustrated in FIG. 5D corresponding to step 411 if simple geometry is utilized. In comparison, FIG. 5E shows the same "Text Object" with complex object geometry, where bounding limits are tightly defined for each character. For step 415, if both complex placement and complex geometry is used, "Text Object" can be morphed and exhibit attributes of motion as indicated in FIG. 5F.

Figure 6A:
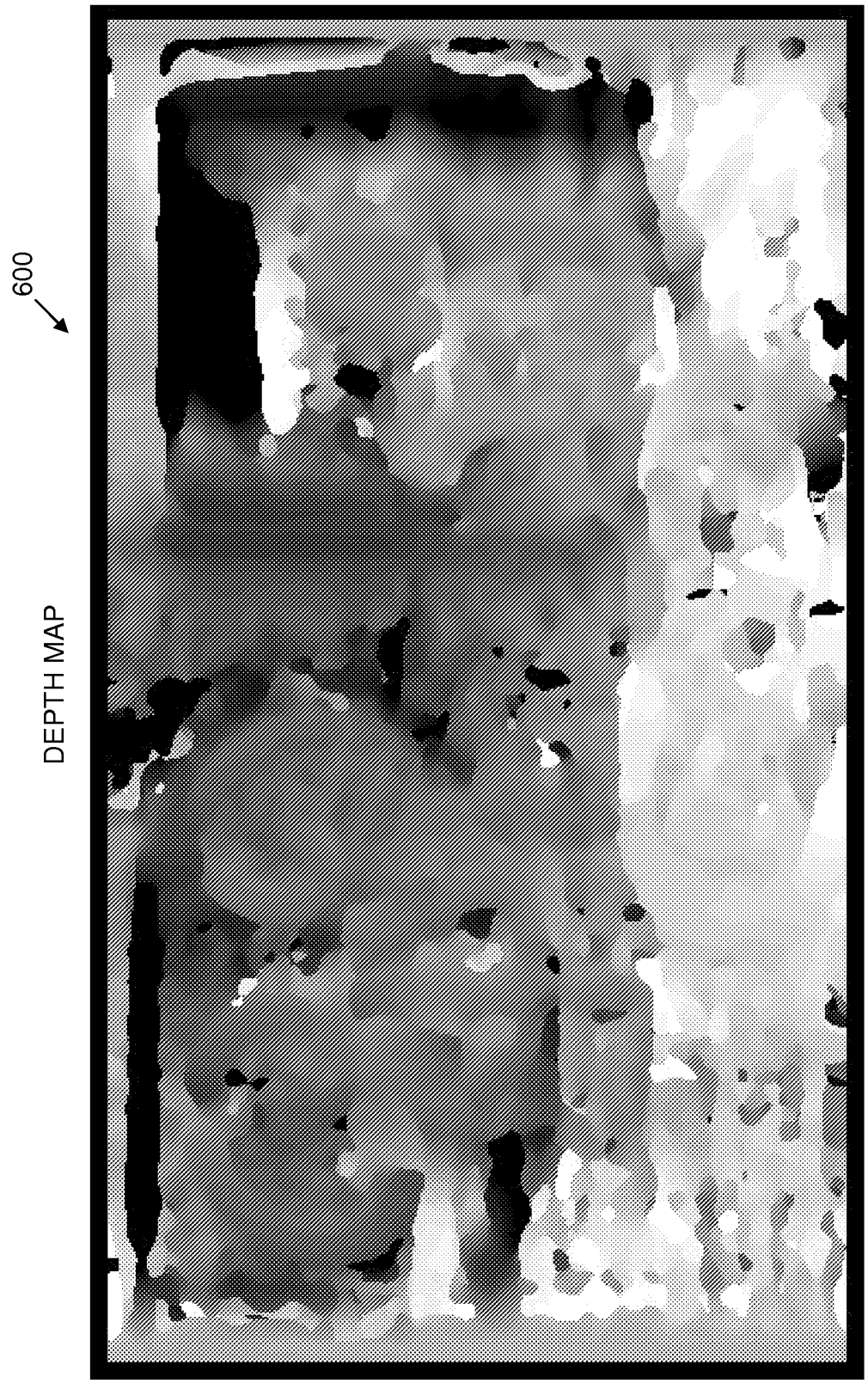
FIGS. 6A-6B illustrate a depth map and its combination with a segmentation disparity map.

Although not shown in flow diagram 400, 3D object placement by, for example, a compositing device can further include use of a depth map according to an embodiment of the invention. Depth maps can refine determinations of depth for features in the pre-existing image, particularly for multi-viewpoint 3D images (e.g., polyscopic images), since depth maps more accurately define the 3D shape of objects over spatial offset analysis. FIG. 6A is an example of a depth map 600 for of the stereoscopic image pair of FIG. 4A. Depth map 600 is monochrome and depth is represented by luminance. Higher luminance is positive z, towards the viewer, and lower luminance is negative z, away from the viewer. Depth maps can also include associated "confidence" values that define the accuracy of the measured depth in each portion of the image. Depth map 600 alone can he factored with its confidence values into the rules of object placement to improve likelihood of avoiding clashes between the inserted object and features in the original image.

Figure 6B:

FIG. 6B illustrates combined use of segmentation analysis with depth map 600. As described above, depth map 600 provides improved 3D shape determinations; however, segmentation disparity maps more accurately define the perceptual depth of features in the original image. Thus, it is advantageous to combine both segmentation disparity and depth maps for superior analysis of the original 3D image. The result is that within the boundaries of the segmentation, the shape is defined by the depth map. Effectively the confidence values of the depth map are dramatically improved.

In another embodiment of the invention, normalized depth techniques are applied by a playback device or compositing device to adjust an existing stereoscopic image for a comfortable viewing depth range. In other words, an available depth in front and behind a screen plane is adjusted for a display size, as well as an individual preference (e.g., the preference of the stereo artist, or the playback device end-user). Notwithstanding that a comfortable viewing depth range is an individual preference, a reasonable and approximate set of rules follows:

(i) Very large screen (e.g., Cinema/I-Max). All exploitable depth in front, where infinity is on the screen plane and maximum positive depth is 60% of viewer distance.

(ii) Large screen (e.g., Cinema). More exploitable depth in front of screen plane than behind (e.g., about ⅔ depth in front, ⅓ depth behind).

(ill) Small Screen (e.g., television, home projection theater). More exploitable depth behind the screen plan than in front (e.g., about ⅓ depth in front, ⅔ depth behind), (iv) Very small screen (e.g., cellular telephone display, or portable television). Infinity as far behind screen plane as possible with no positive depth in front of screen.

Assuming, as an example to illustrate the above rules, that the original stereoscopic image was mastered with infinity point $Z_{ni}$=−100, and the maximum positive depth is $Z_n$=−40

(giving the total depth in the scene as $Z=|Z_{ni}-Z_{ni}|=60$), then the corrected depth position for infinity, $Z_{ci}$, is as follows:
  (i) Very large screen. $Z_{ci}=Z_{ni}+100$; infinity on screen plane, maximum object excursion out of screen 60% of viewer distance.
  (ii) Large screen. $Z_{ci}=Z_{ni}+80$; infinity 20% behind screen plane, maximum object excursion out of screen 40% of viewer distance.
  (iii) Small Screen. $Z_{ci}=Z_{ni}+60$; infinity 40% behind screen plane, maximum object excursion out of screen 20% of viewer distance.
  (iv) Very small screen. $Z_{ci}=Z_{ni}+40$; infinity 60% behind screen plane, no object excursion out of screen.

A device adjusting a stereoscopic image can use one or more of a normalized depth value in metadata, a flag indicating the image is to be adjusted, and additional metadata describing the desired adjustment shift for a plurality of predetermined size displays. For a display site not included in those predetermined sizes, the device can either interpolate an intermediate adjustment shift value using the closest predetermined sizes (e.g., weighted proportion, averaged, averaged and rounded, or explicit weighting specified by metadata) or simply use a value associated with the closest predetermined size. When this adjustment technique is used, over-scanned left and right eye images should be provided in their entirety. The over scanning should be sufficient to allow adjustments at the two extreme points for the adjustment shift values (for example, smallest and largest screens of intended playback devices).

Additionally, the above adjustment of an existing stereoscopic image can be used to correct deficiencies in stereoscopic image capture. For example, when shooting converged, two cameras' imaging planes are angled with respect to each other and converge on the object of interest. The convergence point is thus dependent on the physical arrangement of input cameras, but playback object distance from the viewer is still screen dependant. Convergence can be adjusted in post production by shifting the left and right images horizontally with respect to each other.

Figure 7:
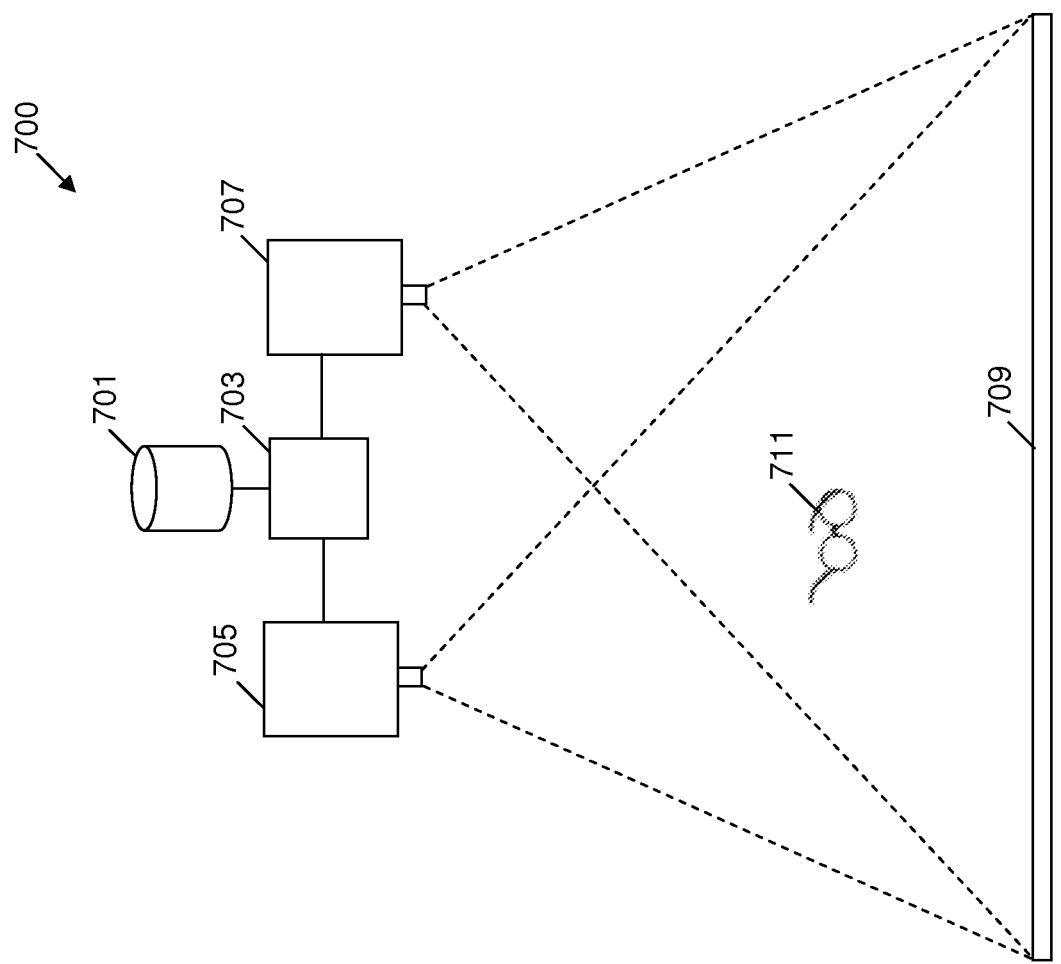
FIG. 7 illustrates a simplified diagram of a 3D projector system according to an embodiment of the invention.

As another embodiment of the invention, a storage medium recording a program of instructions is provided. The storage medium can be at least one of: random access memory (RAM), SDRAM, read-only memory (ROM), programmable read-only memory (PROM), electrically erasable programmable read-only memory (EEPROM), flash memory, optical disk (e.g., CD-ROM, CD-RW, DVD, DVD-RW, blu-ray disk, ultra density optical (UDO) disc, compact disk and the like), magnetic media (e.g., magnetic tape, floppy disk, hard disk drive and the like), paper tape (e.g., punch cards), holographic storage, and molecular memory. The program is executable by a display device to perform a method for generating a visual output. The method includes receiving normalized perceptual depth data as a fraction of viewer distance for at least one object. A pixel separation offset is calculated for the display device's dimension(s) from the normalized perceptual depth data. First and second object images of the at least one object are inserted into a first and second images of the stereoscopic image. The first and second object images are offset by the pixel separation offset. The display device visually outputs the stereoscopic image along with the inserted object, FIG. 7 illustrates a simplified diagram of 3D two projector system 700 according to an embodiment of the invention. Techniques for stereoscopic projection by system 700 can include any of:
  (i) Anaglyph—Left and right eye channel image separation is accomplished by a two color filter, commonly red for one eye and cyan for the other eye. Required eyewear includes a first filter (e.g., red filter) for one eye and a second filter (e.g., cyan filter) for the other eye.
  (ii) Linear polarization—Left and right eye channel image separation is accomplished at the projector by filtering one eye image through a linear polarizer oriented vertically and filtering the other eye image through a linear polarizer oriented horizontally. Required eyewear includes a vertically oriented linear polarizer for one eye and a horizontally oriented polarizer for the other eye.
  (iii) Circular polarization—Left and right eye channel image separation is accomplished at the projector by filtering one eye image through a left handed circular polarizer and filtering the other eye image through a right handed circular polarizer. Required eyewear includes a left handed circular polarizer for one eye and a right handed circular polarizer for the other eye.
  (iv) Shutter glasses—Left and right eye channel image separation is accomplished by multiplexing images in time. Required eyewear includes shutter glasses that electronically shutter the lens in synchrony with the projector's frame rate. Typically a wireless or infrared signal is used to provide a timing reference to the shutter glasses.
  (v) Spectral separation—Left and right eye channel image separation is accomplished at the projector by filtering spectrally. The filters for the left and right eye image each pass a portion of the red, green, and blue spectrum, providing for a full color image. The band pass spectrum of the left eye filter is complementary to the band pass spectrum of the right eye filter. Required eyewear includes filters with the same general spectral characteristics as used by the projector.

In system 700, left eye and right eye channel images are derived, decoded, retrieved, or reconstructed from data stored on disk drive 701 (or received from an appropriate network or transmission reception) by server 703. Similarly, a stereoscopic object to be inserted into left eye and right eye channel images, as well as its proportional positional values, can be stored on disk drive 701 for received from an appropriate network or transmission reception). Server 703 calculates a pixel separation offset for the object based on one or more proportional positional values, such as a received normalized depth, and inserts the objects into the channel images with such offset.

After insertion, the left eye and right eye channel images are projected from left and right channel projectors 705 and 707 onto screen 709 for viewing through 3D glasses 711. If 3D projector system 700 utilizes linear or circular polarization for left and right eye image channel separation, then screen 709 preserves polarization. Polarization preserving type screens available for use as screen 709 are commonly referred to as a "silver screen" because of their distinctive color.

System 700 above has been described as a two projector system one for the left eye and one for the right eye); however, a single D-Cinema projector (e.g., a digital projector) can be used. In an alternative single D-Cinema projector system, the left and right eye channel images are time multiplexed. Except for the shutter glasses case where no projection filters are required, this means that the projection filters must change at the left/right multiplex frequency. This can be done with either a filter wheel in the D-Cinema projector synchronized to the multiplex frequency, or with an electronically switched filter.

It should be appreciated that disk drive 701, an appropriate network (e.g., Internet, WAN, LAN, WiFi, fiber, video cable, satellite broadcast or the like), or a plurality of appropriate networks can each provide the same data, such as the proportional positional data, to multiple playback devices, either serially, simultaneously, or upon demand. Display dimensions of the various playback devices can vary, and are likely to vary dramatically for certain embodiments of the invention. For example, a cellular telephone with built-in display can receive the same image and object insertion data as a much larger home television set and yet achieve the same display results by appropriately adjusting pixel separation offset despite the size difference.

The invention may suitably comprise, consist of, or consist essentially of, any element (the various parts or features of the invention) and their equivalents as described herein. Further, the invention illustratively disclosed herein may be practiced in the absence of any element, whether or not specifically disclosed herein. Numerous modifications and variations of the invention are possible in light of the above teachings. It is therefore to he understood that within the scope of the appended claims, the invention may be practiced otherwise than as specifically described herein.

What is claimed is:

1. Method for rendering at least one object into a stereoscopic image for a display device, the method comprising:
   receiving normalized perceptual depth data as a fraction of an intended viewer distance from the at least one object, wherein the normalized perceptual depth data is independent of the dimensions of the display device and a viewer's interocular separation;
   calculating a pixel separation offset from the perceptual depth data based on a known or communicated screen width of said display device;
   inserting a first object image of the at least one object into a first Image of the stereoscopic image; and
   inserting a second object image of the at least one object into a second image of the stereoscopic image,
   wherein the first object image and second object image are offset by the pixel separation offset.

2. The method of claim 1 wherein the at least one object is captioning text.

3. The method of claim 1 wherein the first object image and the first image are left eye images, the second object image and the second image are right eye images.

4. The method of claim 1 further comprising after the inserting, outputting in a data stream the first image and the second image.

5. The method of claim 1 wherein the known or communicated screen width is the physical screen width of the display device.

6. The method of claim 1, further comprising computing a normalized pixel separation offset for a normalized screen from the received perceptual depth data, the normalized screen having a known screen width and a known resolution, wherein said calculating said pixel separation offset comprises calculating said pixel separation offset from the normalized pixel separation offset and said known or communicated screen width of said display device.

7. The method of claim 1 wherein said normalized screen is a 1000 pixel wide screen with a 1 millimeter per pixel resolution.

8. The method of claim 1 wherein the display device is at least one of a cellular telephone, handheld media player, television, computer monitor, and cinema projector.

9. A non-transitory storage medium recording a program of instructions that is executable by a display device to perform a method according to claim 1.

10. Method for object insertion into a stereoscopic image, the method comprising:
    transmitting the stereoscopic image to a first playback device;
    transmitting normalized perceptual depth data as a fraction of intended viewer distance from at least one object to the first playback device, wherein the normalized perceptual depth data is independent of the dimensions of the first playback device and a viewer's interocular separation;
    the first playback device calculating a first pixel separation offset from the perceptual depth data based on a known or communicated screen width of the first playback device;
    the first playback device inserting respective object images of the at least one object, offset by the first pixel separation offset, into respective images of the stereoscopic image;
    transmitting the stereoscopic image to a second playback device;
    transmitting the perceptual depth data as the fraction of intended viewer distance to the second playback device, wherein the normalized perceptual depth data is independent of the dimensions of the second playback device and a viewer's interocular separation;
    the second playback device calculating a second pixel separation offset based on a known or communicated screen width of the second playback device from the perceptual depth data;
    the second playback device inserting respective object images of the at least one object, offset by the second pixel separation offset, into respective images of the stereoscopic image,
    wherein the screen width of the first playback device is different from the screen width of the second playback device, so that the first pixel separation offset is unequal to the second pixel separation offset.

11. The method of claim 10 wherein the screen width of the first playback device is at least 5 times smaller than the screen width of the second playback device.

12. The method of claim 11 wherein the first playback device is a handheld device.

13. The method of claim 10 wherein the second playback device comprises two projectors.

14. An apparatus for generating an output signal that comprises:
    (a) an input terminal;
    (b) an output terminal; and
    (c) a signal processing circuitry coupled to the input terminal and the output terminal,
    wherein the signal processing circuitry is adapted to:
      receive normalized perceptual depth data as a fraction of intended viewer distance from the at least one object, wherein the normalized perceptual depth data is independent of the dimensions of a display device and a viewer's interocular separation;
      calculate a pixel separation offset based on a known or communicated screen width of said display device using the perceptual depth data; and
      insert, respectively, a left eye object image and a right eye object image of the at least one object into a left eye image and a right eye image of a stereoscopic image,
    wherein the left eye object image and right eye object image are offset by the pixel separation offset.

15. Method for rendering at least one object into a stereoscopic image for a display device, the method comprising:

receiving perceptual depth data as a fraction of an intended viewer distance, irrespective of the dimensions of the display device, for the at least one object;

identifying at least one feature within the stereoscopic image;

determining at least one first spatial offset for the at least one feature;

creating a disparity map of the stereoscopic image as a function of the at least one first spatial offset;

calculating at least one second spatial offset for the at least one object;

normalizing the at least one second spatial offset, thereby expressing the at least one second spatial offset as the fraction of the intended viewer distance thus obtaining at least one normalized second spatial offset;

adjusting the at least one normalized second spatial offset, as a function of the disparity map;

inserting a first object Image of the at least one object into a first Image of the stereoscopic image; and inserting a second object image of the at least one object into a second image of the stereoscopic image, wherein the first object image and second object image are offset by the at least one normalized second spatial offset.

16. The method of claim 15, further comprising determining a geometry for at least one bounding limit for at least one object.

17. Method for object insertion into a stereoscopic image, the method comprising:

transmitting the stereoscopic image to a first playback device;

transmitting perceptual depth data as a fraction of an intended viewer distance, irrespective of the dimensions of the first playback device, for at least one object to the first playback device;

the first playback device, at least one feature within the stereoscopic image;

determining, through the first playback device, at least one first spatial offset for said at least one feature;

creating, through the first playback device, a disparity map of the stereoscopic image as a function of said at least one first spatial offset;

calculating, through the first playback device, at least one second spatial offset for the at least one object;

normalizing, through the first playback device, the at least one second spatial offset, thereby expressing the at least one second spatial offset as the fraction of the intended viewer distance thus obtaining at least one normalized second spatial offset;

adjusting, through the first playback device, the at least one normalized second spatial offset, as a function of the disparity map;

the first playback device inserting respective object images of the at least one object, offset by the second spatial offset, into respective images of the stereoscopic image;

transmitting the stereoscopic image to a second playback device;

transmitting the perceptual depth data as the fraction of the intended viewer distance, irrespective of the dimensions of the second playback device, to the second playback device;

transmitting the disparity map for the at least one feature to the second playback device;

transmitting the normalized second spatial offset for the at least one object to the second playback device;

calculating, through the second playback device, a third spatial offset as a function of the transmitted disparity map, normalized second spatial offset, and a known or communicated screen width for the second playback device; and inserting, through the second playback device, respective object images of the at least one object, offset by the third spatial offset, into respective images of the stereoscopic image, wherein the screen width of the first playback device is different from the screen width of the second playback device, so that the second spatial offset is unequal to the third spatial offset.

18. The method of claim 17, further comprising the first playback device determining a geometry for at least one bounding limit for the at least one object.

19. An apparatus for generating an output signal that comprises:

(a) an input terminal;
(b) an output terminal; and
(c) a signal processing circuitry coupled to the input terminal and the output terminal, wherein the signal processing circuitry is configured to:

receive perceptual depth data as a fraction of an intended viewer distance, irrespective of the dimensions of a display device, for at least one object;

identify at least one feature within the stereoscopic image;

determine at least one first spatial offset for the at least one feature;

create a disparity map of the stereoscopic image as a function of the at least one first spatial offset;

calculate at least one second spatial offset for the at least one object;

normalize the at least one second spatial offset, thereby expressing the at least one second spatial offset as the fraction of the intended viewer distance, thus obtaining at least one normalized second spatial offset;

adjust the at least one normalized second spatial offset, as a function of the disparity map; and insert, respectively, a left eye object image and a right eye object image of the at least one object into a left eye image and a right eye image of a stereoscopic image, wherein the left eye object image and right eye object image are offset by the at least one normalized second spatial offset.

20. The apparatus of claim 19, wherein the signal processing circuitry is further adapted to determine a geometry for at least one bounding limit for the at least one object.

* * * * *